United States Patent [19]

Ruitenburg

[11] Patent Number: 4,929,905
[45] Date of Patent: May 29, 1990

[54] SYNCHRONOUS DEMODULATION CIRCUIT FOR A CARRIER-MODULATED TELEVISION SIGNAL

[75] Inventor: Leonardus J. M. Ruitenburg, Eindhoven, Netherlands

[73] Assignee: U.S. Philips Corporation, New York, N.Y.

[21] Appl. No.: 320,133

[22] Filed: Mar. 6, 1989

[30] Foreign Application Priority Data

Mar. 7, 1988 [NL] Netherlands .......................... 8800555

[51] Int. Cl.⁵ .............................................. H03D 1/00
[52] U.S. Cl. .................................... 329/358; 329/363; 358/188
[58] Field of Search .................... 358/11, 12, 21 R, 23, 358/25, 140, 141, 160, 188; 329/358, 363; 375/77; 455/204

[56] References Cited

U.S. PATENT DOCUMENTS

| | | | |
|---|---|---|---|
| 4,157,569 | 6/1979 | Apeldoorn et al. | 358/160 |
| 4,264,975 | 4/1981 | Voorman | 375/94 |
| 4,633,315 | 12/1986 | Kasperkovitz | 358/160 |
| 4,642,675 | 2/1987 | Gassmann | 358/23 |
| 4,789,897 | 12/1988 | Kappeler et al. | 358/160 |

Primary Examiner—John W. Shepperd
Assistant Examiner—Michael D. Parker
Attorney, Agent, or Firm—Edward W. Goodman

[57] ABSTRACT

In a synchronous demodulation circuit for an IF television signal, having a passive carrier regenerator (37, 39), a quadrature component unwantedly demodulated by a synchronous in-phase demodulator (15) is compensated for by multiplying the output signal of this demodulator by the integrated (63) output signal of a synchronous in-phase demodulator (25) and by adding (79) the product obtained to the product of the output signal of a synchronous quadrature demodulator (19) and the integrated (65) output signal of a synchronous quadrature demodulator (29).

9 Claims, 2 Drawing Sheets

SYNCHRONOUS DEMODULATION CIRCUIT FOR A CARRIER-MODULATED TELEVISION SIGNAL

BACKGROUND OF THE INVENTION

1. Field of the Invention

The invention relates to a synchronous demodulation circuit for a carrier-modulated television signal, comprising a passive carrier regeneration circuit for obtaining an in-phase and a quadrature reference signal for synchronously demodulating the television signal in an in-phase and a quadrature demodulator, respectively, to outputs of the in-phase and quadrature demodulators being coupled to a first and a second input, respectively, of a combination circuit having an output from which a video signal is obtained.

2. Description of Related Art

A synchronous demodulation circuit of the type described above is known from U.S. Pat. No. 4,157,569, in which the output signal of the in-phase demodulator is directly applied to the combination circuit and the output signal of the quadrature demodulator is applied to the combination circuit via a rectifier circuit. A video signal is then obtained from the output of the combination circuit, which video signal can be used, for example, for obtaining synchronizing signals. This video signal remains usable for this purpose if, for example, due to detuning, a phase difference is produced between the actual and the desired phase of the reference signals. A video signal which is usable for the display in a television image is obtained from the in-phase demodulator.

SUMMARY OF THE INVENTION

It is an object of the invention to minimize the distortion of the output signal of the combination circuit.

To this end a synchronous demodulation circuit according to the invention is characterized in that the synchronous demodulation circuit comprises a first and a second multiplier an input of each multiplier being coupled via at least a first and a second low-pass filter, respectively, to corresponding outputs of a circuit for obtaining a synchronous in-phase and quadrature-demodulated television signal, said first and second multipliers being arranged in such a manner that the amplitudes of the signals at the first and the second input, respectively, of the combination circuit are also substantially proportional to those of the signals at the inputs of the multipliers, respectively; multiplier.

Due to this measure, an unwanted quadrature component in the video signal at the output of the combination circuit can be suppressed to a very considerable extent. This unwanted quadrature component is due to the demodulation of the quadrature component of the single sideband component of the television signal by the in-phase demodulator, if a phase difference occurs between the actual and the desired phase of the reference signal for this demodulator.

The quadrature component in the output signal of the combination circuit is suppressed at such a phase difference in such manner that this output signal can also be used for a low-distortion picture display.

The suppression of the quadrature component can be further enhanced if, in accordance with a further elaboration of the invention, a first and a second amplitude control circuit are arranged in series with the first and the second low-pass filters, respectively, control signal inputs of said circuits being coupled to a circuit for obtaining the difference between the square values of the products of the output signals of the in-phase and quadrature demodulators and those of the second and the first low-pass filters, respectively. As a result of this control, the gain factors of the signal paths with the low-pass filters are maintained equal so that the suppression of the quadrature component becomes as large as possible.

BRIEF DESCRIPTION OF THE DRAWING

The invention will now be described in greater detail, by way of example, with reference to the accompanying drawings, in which.

DESCRIPTION OF THE PREFERRED EMBODIMENTS

Figure 1:
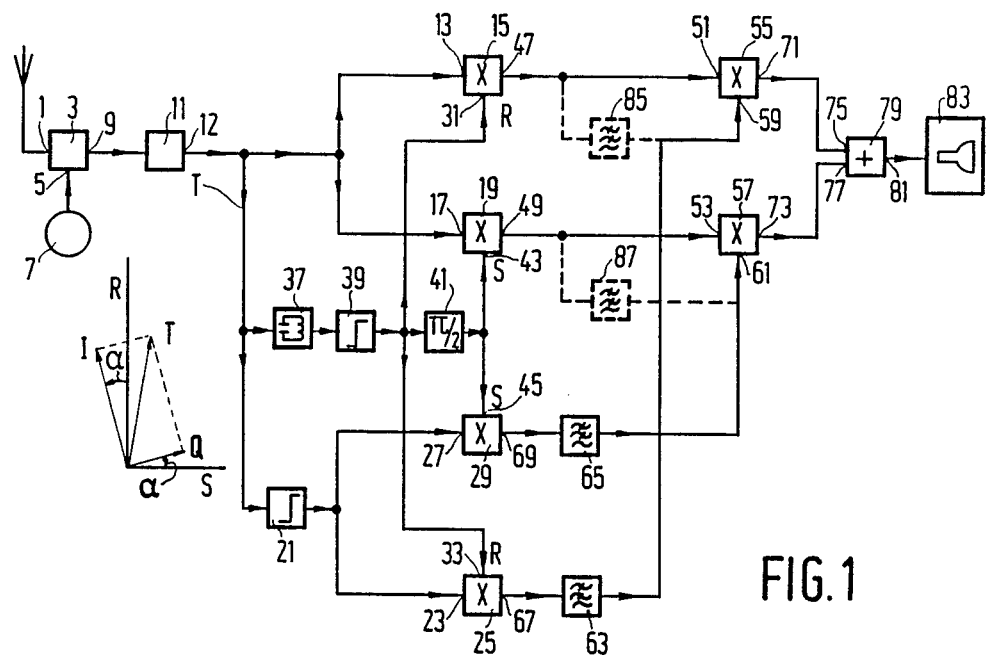
FIG. 1 is a concise block diagram of a television receiver with a possible embodiment of a synchronous demodulation circuit according to the invention.

In FIG. 1, a received RF television signal is applied to an input 1 of an RF mixer stage 3. An input 5 of the RF mixer stage 3 receives an oscillator signal from an oscillator 7, producing an IF television signal T at an output 9 of the RF mixer stage 3, which signal is applied via an IF amplifier 11, by an output 12 thereof, to an input 13 of an in-phase demodulator 15 and to an input 17 of a quadrature demodulator 19.

This IF television signal T has an in-phase component I whose phase corresponds to the phase of an unmodulated IF picture carrier and a quadrature component Q which is different by 90° therefrom and which is caused by a single sideband component of the television signal.

The output 12 of the IF amplifier 11 further supplies via a limiter circuit 21 an amplitude-limited television signal to an input 23 of a second in-phase demodulator 25 and to an input 27 of a second quadrature demodulator 29.

The first and second in-phase demodulators 15 and 25 have reference signal inputs 31 and 33, respectively, to which an in-phase reference signal R is applied which is obtained via a picture IF filter 37 and a further limiter circuit 39 from the output 12 of the IF amplifier 11.

The further limiter circuit 39 also applies a quadrature reference signal S via a 90° phase-shifting circuit to reference signal inputs 43 and 45 of the first and second quadrature demodulators 19 and 29, respectively.

If, for example, due to a detuning, the in-phase component I of the IF television signal T has a phase difference $\alpha$ with respect to the in-phase reference signal R, a demodulated signal $$I \cdot \cos \alpha + Q \cdot \sin \alpha \qquad (1)$$

is produced at an output 47 of the first-mentioned in-phase demodulator 15 and a demodulated signal $$-I \cdot \sin \alpha + Q \cdot \cos \alpha \qquad (2)$$

is produced at an output 49 of the first-mentioned quadrature demodulator 19.

These signals are applied to inputs 51 and 53 of first and second multipliers 55 and 57, respectively, further inputs 59 and 61 of which receive the low-frequency part of a demodulated signal $$\cos \alpha + q \cdot \sin \alpha \qquad (3) \text{ and}$$

$$-\sin \alpha + q \cdot \cos \alpha \qquad (4),$$
respectively, from outputs 67 and 69 of the second in-phase and quadrature demodulators 25 and 29, respectively, via first and second low-pass filters 63 and 65, respectively.

Due to the limiter circuit 21, the amplitude of the components of these signals (3) and (4) is constant and, for the sake of clarity, it is assumed to be equal to one for the $\cos \alpha$ and $-\sin \alpha$ in (3) and (4), respectively.

The $q \cdot \sin \alpha$ and $q \cdot \cos \alpha$ components in (3) and (4), respectively, each time change sign because the quadrature component Q of the television signal each time changes sign due to its AC character.

The low-pass filters 63 and 65 suppress the component of the changing sign $q \cdot \sin \alpha$ and $q \cdot \cos \alpha$ in (3) and (4), respectively, so that the further inputs 59 and 61 of the first and second multipliers 55 and 57, respectively, receive signals $$\cos \alpha \qquad (5) \text{ and}$$

$$-\sin \alpha \qquad (6),$$
respectively.

Signals $$I \cdot \cos^2 \alpha + Q \cdot \sin \alpha \cdot \cos \alpha \qquad (7) \text{ and}$$

$$I \cdot \sin^2 \alpha - Q \cdot \sin \alpha \cdot \cos \alpha \qquad (8)$$

are then produced at outputs 71 and 73 of the first and second multipliers 55 and 57, respectively.

The signals (7) and (8) are applied to first and second inputs 75 and 77, respectively, of a combination circuit 79 constituted in this case as an adder circuit, while a video signal $I \cdot (\cos^2 \alpha + \sin^2 \alpha) = I$ is then produced at an output 81 thereof in which the quadrature component Q is suppressed and which can be used in a picture display device 83 for low-distortion display.

It is evident that, for example, an AVC control signal and synchronizing signals can also be obtained from this video signal.

The limiter circuit 21 and the second in-phase and quadrature demodulators 25 and 29, respectively, constitute a circuit for obtaining a synchronous in-phase and quadrature-demodulated signal. The limiter circuit 21 and the second in-phase and quadrature demodulators can be omitted if, as is shown by broken lines, the outputs 47 and 49 of the first-mentioned in-phase and quadrature demodulators 15 and 19 are connected via low-pass filters 85 and 87 having a very large time constants to the further inputs 59 and 61 of the first and second multipliers 55 and 57, respectively.

The time constants must then be so large that amplitude variations in the signal I are also smoothed. However, this is less practical for an integrated version of the circuit.

It has been assumed in the foregoing that the double sideband part of the television signal is still present in the signal at the output 12 of the IF amplifier 11. However, a filter having a Nyquist edge at the picture intermediate frequency will generally be incorporated between, on the one hand the output 12 of the IF amplifier 11 and, on the other hand, the inputs 13 and 17 of the synchronous in-phase and quadrature demodulators 15 and 19, respectively, and the input of the limiter 21.

If desired, the first and second multipliers 55 and 57 may be incorporated, for example, in an input circuit of the synchronous in-phase and quadrature demodulators 15 and 19, respectively, in order to obtain the given amplitude multiplication.

Figure 2:
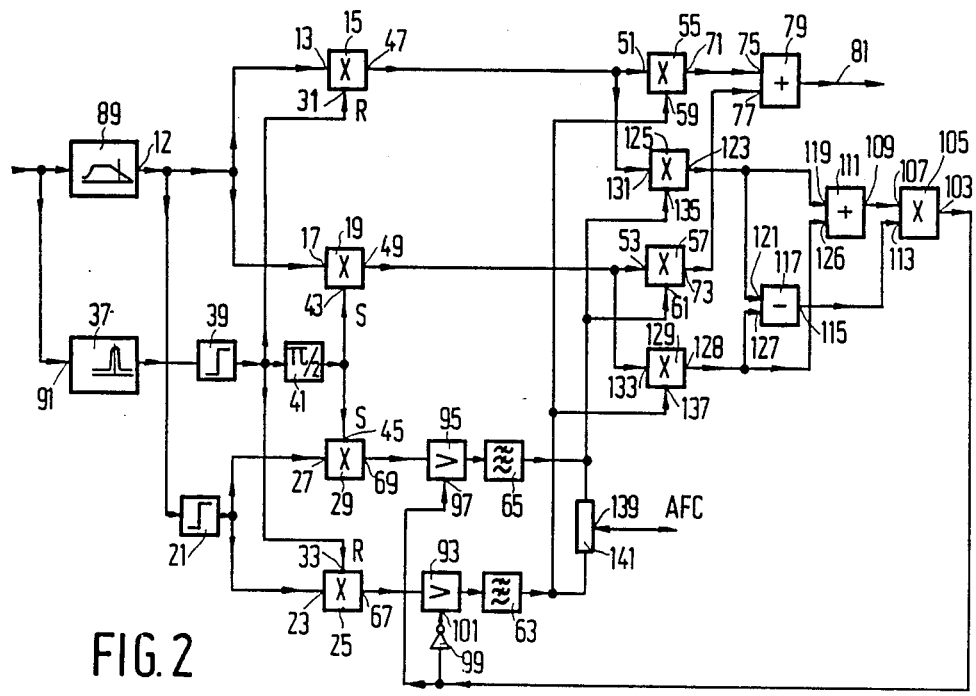
FIG. 2 is a block diagram of another possible embodiment of a synchronous demodulation circuit according to the invention.

In FIG. 2 corresponding components are denoted by the same reference numerals as those in FIG. 1. Reference is made to FIG. 4 for their description.

Reference number 12, which was the output of the IF amplifier in FIG. 1 is now the output of an IF filter 89 having a Nyquist edge at the IF picture carrier and, like in FIG. 1, the IF picture carrier filter 37 receives at an input 91 a signal in which the double sideband part of the television signal does not undergo any phase modulation due to frequency-dependent phase shifts in filters. This further reduces the distortion during detection.

Furthermore, first and second controllable amplifiers 93 and 95 are arranged between the outputs 67 and 69 of the second in-phase and quadrature demodulators 25 and 29 and the first and second low-pass filters 63 and 65, respectively. These amplifiers are controlled in the opposite sense by a control signal which is applied to a control signal input 97 of the second controllable amplifier 95 and via an inverter 99 to a control signal input 101 of the first controllable amplifier 93. The total gains in the signal paths incorporating these amplifiers are thereby controlled to be equal.

This control signal is obtained from an output 103 of a multiplier 105, a first input 107 of which is connected to an output 109 of an adder circuit 111 and a second input 113 of which is connected to an output 115 of a subtractor circuit 117.

First inputs 119 and 121 of the adder circuit 111 and the subtractor circuit 117, respectively, are connected to an output 123 of a multiplier 125, and second inputs 126 and 127 of the adder circuit 111 and the subtractor circuit 117, respectively, are connected to an output 128 of a multiplier 129. First inputs 131 and 133 of the multipliers 125 and 129 receive the signals (1) and (2), respectively, and second inputs 135 and 137 receive the signals (6) and (5), respectively.

A signal $$\{(1) \cdot (6) + (2) \cdot (5)\} \{(1) \cdot (6) - (2) \cdot (5)\} = \{(1) \cdot (6)\}^2 - \{(2) \cdot (5)\}^2$$

is now produced at the output 103 of the multiplier 105. This control signal is the difference between the square values of the products of the output signals of the first-mentioned in-phase and quadrature demodulators and those of the second and first low-pass filters and it may be alternatively obtained in different manners with the aid of multipliers and adder and/or subtractor circuits.

The gain of the amplifiers 93 and 95 is controlled by means of this control signal in such a way that the quadrature component in the video signal is suppressed to an even greater extent at the output 81.

If desired, for example, an AFC signal can be obtained from the output of the second low-pass filter 65 in the circuits of the embodiments described, if the angle $\alpha$ is small. If an arbitrary angle $\alpha$ is to be taken into account, which in the case of a correct tuning of the receiver may occur in the filters 39 and 89 due to, for example, delay time differences, the AFC signal can be obtained from an output 139 of a potentiometer 141 which is arranged between the outputs of the low-pass filters 63 and 65 and which can be adjusted, dependent on said angle α, for obtaining a correct control characteristic.

Figure 3:
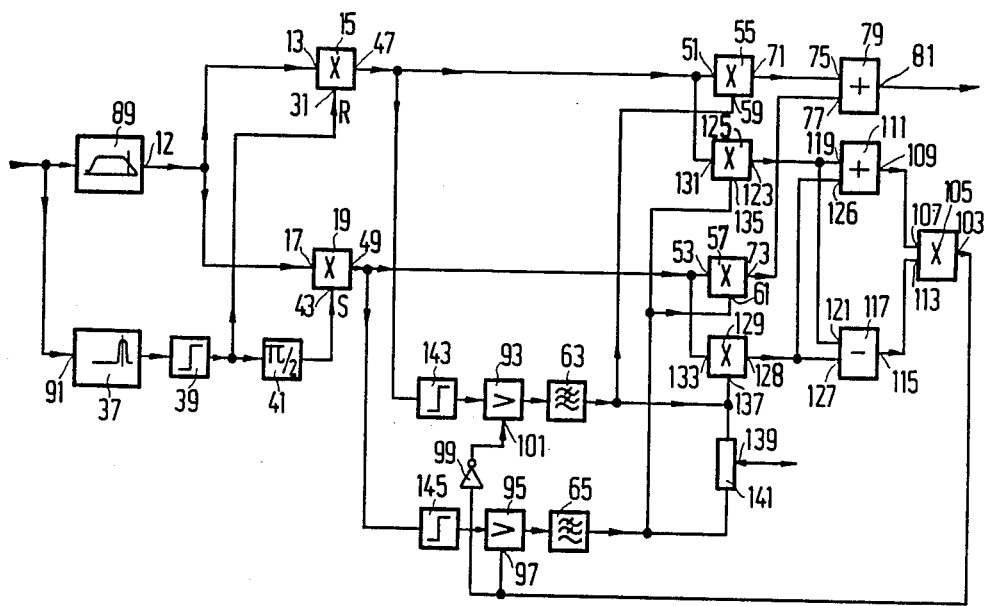
FIG. 3 is a block diagram of a further possible embodiment of a synchronous demodulation circuit according to the invention.

In FIG. 3 corresponding components have the same reference numerals as those in the previous Figures. Reference is made to FIGS. 1 and 2 for their description.

The embodiment of FIG. 3 is distinguished from that of FIG. 2 in that the inputs of the amplifiers 93 and 95 are connected via limiters 143 and 145 to the outputs 47 and 49 of the in-phase and quadrature demodulators 15 and 19, respectively. These limiters pass the sign of the output signal of the relevant demodulator to the amplifiers 93, 95 which are controlled in the opposite sense. It appears that the desired cosine function then occurs at the further input 59 of the first multiplier 55 and the desired negative sine function appears at the further input 61 of the second multiplier 55.

If desired, the filters 37 and 87 may form part of a surface-acoustic-wave filter.

If desired, the gain control described with reference to FIG. 2 may also be used in the embodiments shown in FIG. 1.

I claim:

1. A synchronous demodulation circuit for a carrier-modulated television signal (T), comprising a passive carrier regeneration circuit for obtaining an in-phase (R) and quadrature reference signal (S) for synchronously demodulating the television signal in an in-phase and a quadrature demodulator, respectively, outputs of the in-phase and quadrature demodulators being coupled, respectively, to a first and a second input, respectively, of a combination circuit having an output from which a video signal is obtained, characterized in that the synchronous demodulation circuit further comprises a first and a second multiplier having respective inputs coupled via at least a first and a second low-pass filter, respectively, to corresponding outputs of a circuit for obtaining a synchronous in-phase and a quadrature-demodulated television signal, said first and second multipliers being arranged in such a manner that the amplitudes of the signals at the first and the second input, respectively, of the combination circuit are also substantially proportional to that of the signals at said respective inputs of the multipliers.

2. A synchronous demodulation circuit as claimed in claim 1, characterized in that the outputs of the in-phase and quadrature demodulators, respectively, are coupled to further respective inputs of the first and second multipliers, said multipliers having respective outputs coupled to the first and second inputs of the combination circuit, and in that said respective inputs of said first and second multipliers are coupled at least via said first and second low-pass filters to the corresponding outputs of the circuit for obtaining the synchronous in-phase and quadrature-demodulated television signals, respectively.

3. A synchronous demodulation circuit as claimed in claim 1 or 2, characterized in that first and second amplitude control circuits are arranged in series with the first and the second low-pass filters, control signal inputs of said circuits being coupled to a circuit for obtaining a difference between square values of the products of the output signals of the first-mentioned in-phase and quadrature demodulators and those of the second and the first low-pass filters respectively.

4. A synchronous demodulation circuit as claimed in claim 1 or 2, characterized in that the circuit for obtaining a synchronous in-phase and a quadrature-demodulated television signal comprises a second in-phase and quadrature demodulators inputs of which are coupled at leas through a limiter circuit to the corresponding inputs of the first-mentioned in-phase and quadrature demodulators for a signal to be demodulated.

5. A synchronous demodulation circuit as claimed in claim 3, characterized in that the first and second amplitude control circuits are coupled via limiters to the outputs of the in-phase and quadrature demodulators respectively.

6. A synchronous demodulation circuit as claimed in claim 3, characterized in that the television signal is applied via an IF filter with a picture carrier Nyquist edge to the inputs for the signal to be demoduated of the synchronous in-phase and quadrature demodulators and via a picture carrier IF filter and a further limiter circuit to reference signal inputs of said demodulators, respectively.

7. A synchronous demodulation circuit as claimed in claim 6, characterized in that the IF filter with a picture carrier Nyquist edge and the picture carrier IF filter form part of a surface-acoustic-wave filter.

8. A synchronous demodulation circuit as claimed in claim 7, characterized in that a frequency control signal is obtained at least from the output of the second low-pass filter.

9. A synchronous demodulation circuit as claimed in claim 8, characterized in that the frequency control signal is obtained from an output of a potentiometer circuit which is arranged between the output of the second and the first low-pass filter.

* * * * *